US010608226B2

(12) United States Patent
Xie et al.

(10) Patent No.: US 10,608,226 B2
(45) Date of Patent: Mar. 31, 2020

(54) SEPARATOR FOR A RECHARGEABLE BATTERY

(71) Applicant: Hong Kong Applied Science and Technology Research Institute Company Limited, Shatin (HK)

(72) Inventors: Laiyong Xie, Shen Zhen (CN); Jing Xiang, Shatin (HK); Pau Yee Lim, New Territories (HK)

(73) Assignee: Hong Kong Applied Sciene and Technology Research Institute Co. Ltd., Shatin (HK)

( * ) Notice: Subject to any disclaimer, the term of this patent is extended or adjusted under 35 U.S.C. 154(b) by 78 days.

(21) Appl. No.: 16/137,699

(22) Filed: Sep. 21, 2018

(65) Prior Publication Data
US 2019/0027728 A1  Jan. 24, 2019

Related U.S. Application Data

(63) Continuation-in-part of application No. 15/238,796, filed on Aug. 17, 2016, now Pat. No. 10,109,843.

(51) Int. Cl.
*H01M 4/02* (2006.01)
*H01M 2/16* (2006.01)
*H01M 2/14* (2006.01)
*H01M 10/0525* (2010.01)

(52) U.S. Cl.
CPC ......... *H01M 2/1686* (2013.01); *H01M 2/145* (2013.01); *H01M 2/1653* (2013.01); *H01M 10/0525* (2013.01)

(58) Field of Classification Search
CPC .................................................. H01M 4/02
See application file for complete search history.

(56) References Cited

U.S. PATENT DOCUMENTS

| 2013/0040185 | A1  | 2/2013 | Takase |
| 2015/0093627 | A1* | 4/2015 | Busch ............... H01M 10/4235 429/145 |

FOREIGN PATENT DOCUMENTS

| CN | 102569700 B | 1/2014 |
| CN | 103956448 A | 7/2014 |
| CN | 104051696 A | 9/2014 |
| CN | 104157811 A | 11/2014 |
| CN | 104428920 A | 3/2015 |

(Continued)

OTHER PUBLICATIONS

ISR and Written Opinion; PCT/CN2018/109721; dated Jun. 3, 2019.
Translation of Abstracts of cited Chinese references.

*Primary Examiner* — Jacob B Marks

(57) ABSTRACT

The invention provides a coating or film adapted to be arranged between a separator and at least one electrode of a rechargeable battery. The coating or film comprises a porous layer comprising a layer material having at least a first material and a second material, the first and the second materials being arranged to comprise a plurality of pores for passage of ions therethrough; and the second material is adapted to reduce in size upon drying such that porosity of the porous layer is improved or enhanced at a normal operating temperature; wherein, in response to temperature change, the layer material is adapted to undergo a first phase change during which the pores of said porous layer are adapted to substantially close to thereby substantially reduce or prevent further passage of ions.

20 Claims, 15 Drawing Sheets

(56) References Cited

FOREIGN PATENT DOCUMENTS

| CN | 105440770 | A | 3/2016 |
|----|-----------|---|--------|
| CN | 105932203 | A | 9/2016 |
| CN | 106463683 | A | 2/2017 |
| KR | 20140029691 | A | 3/2014 |

* cited by examiner

SEPARATOR FOR A RECHARGEABLE BATTERY

This application is a continuation-in-part application claiming priority to co-pending U.S. patent application Ser. No. 15/238,796, filed Aug. 17, 2016, which is incorporated herein for all purposes.

FIELD OF THE INVENTION

The invention relates to the field of rechargeable batteries, particularly but not exclusively, to a separator for use in a rechargeable battery such as a lithium ion battery.

BACKGROUND OF THE INVENTION

Different rechargeable batteries such as lead-acid batteries, nickel cadmium (NiCd) batteries, nickel metal hydride (NiMH) batteries, and lithium ion (Li-ion) batteries have been developed and widely used. Among the various types of rechargeable batteries, lithium ion batteries are known to be commonly applied to consumer electronic products such as portable electronic devices due to their relatively compact size, light weight and high energy density.

Nevertheless, lithium ion batteries are also known to present safety risks and may even be dangerous such as during a thermal runaway event, which may result in flaming or even an explosion of the battery. For example, thermal runaway in a faulty rechargeable battery may be caused by an internal short circuit of the battery due to an external impact or crash of the battery. The internal short circuit can cause heat generation which may shrink the battery separator, and can result in a more severe short circuit. Thermal runaway may also be caused by overcharging of a rechargeable battery, which also generates excess heat. Traditionally, thermal runaway of the rechargeable battery can be prevented, minimized or reduced by, for example, avoiding generation of heat due to a short circuit and/or providing heat resistant layers at the separator of the rechargeable battery. Poor air permeability of the heat resistant layer may further affect performance of the battery.

OBJECTS OF THE INVENTION

An object of the present invention is to provide a separator coating or film for use in a rechargeable battery.

Another object of the present invention is to provide a separator for use in a rechargeable battery.

A further object of the present invention is to mitigate or obviate to some degree one or more problems associated with known separator coatings or films and separators for rechargeable batteries.

A further object of the present invention is to provide a rechargeable battery having a novel separator configured to improve or enhance air permeability.

The above objects are met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

In general, the invention provides a separator coating or film, and/or a separator with such coating or film, for use in a rechargeable battery such as, but not limited to, a lithium ion rechargeable battery. The invention can be provided in the form of a coating layer adapted to be disposed at or coated on one or more surfaces of the battery separator, and/or a prepared film layer adapted to be placed or arranged between one or more surfaces of the separator and one or more of the battery electrodes, i.e. the anode or the cathode. The separator is an ion permeable component, such as in the form of a membrane, placed between the anode and the cathode of the battery. Particularly, the present invention allows the separator coating or film with an enhanced air permeability at its normal operating condition and, in response to an abnormal temperature change, provides a "self-shutdown" mechanism to thereby reduce or prevent chemical reaction at the battery.

To achieve this, the coating or film of the present invention may comprise a porous layer material comprising at least a first material and a second material, with the pores being open under normal operating temperatures to allow passage of ionic charge carriers, such as lithium ions, between the anode and the cathode during discharging and recharging of the rechargeable battery. Particularly, during a normal operating condition, the second material of the porous layer is adapted to shrink or reduce in size upon drying, for example, due to a removal of solvent such as water during the preparation or manufacturing step of the coating or film and/or the separator. The shrinkage or the reduction in size of the second material results in an enlargement of the pore size and/or the number of pores of the porous layer, which improves or enhances porosity of the porous layer and thus, air permeability of the coating or film.

Under an abnormal operating condition which can be, for example, during a short circuit of the rechargeable battery in which excess heat is generated, operating temperature will be elevated to reach or pass a certain predetermined threshold temperature. In response to this abnormal temperature change, the pores of the porous layer will be substantially closed due to a temperature responsive fusion of the layer material. As a consequence, passage of ions are reduced, minimized or even prevented to thereby stop the chemical reaction of the battery and thus, reduce, minimize or prevent further heat generation.

The coating or film may further comprise a third material for binding the porous layer to the separator and/or the electrodes to thereby reduce, minimize or prevent thermal separation or shrinkage from the separator.

The present invention is advantageous in that it provides a separator coating having an automatic, temperature-responsive shut-down mechanism effective in reducing, preventing or minimizing excess heat generation due to a short circuit or overcharge of a rechargeable battery and, at the same time, offers an improved or enhanced air permeability. The separator coating thus reduces the chances of potential safety hazards relating to the operation of the rechargeable battery such as thermal runaway and allows the rechargeable battery to operate at an optimum performance.

In a first main aspect, the invention provides a coating or film adapted to be arranged between a separator and at least one electrode of a rechargeable battery. The coating or film preferably comprises a porous layer comprising a layer material having at least a first material and a second material, the first and the second materials being arranged to comprise a plurality of pores for passage of ions therethrough; wherein the second material is adapted to reduce in size upon drying such that porosity of the porous layer is improved or enhanced at a normal operating temperature; and, in response to temperature change, the layer material is adapted to undergo a first phase change during which the pores of said porous layer are adapted to substantially close to thereby substantially reduce or prevent further passage of ions.

In a second main aspect, the invention provides a rechargeable battery having a novel separator comprising a coating or film according to the first aspect.

In a third main aspect, the invention provides a method of manufacturing a rechargeable battery. The method comprises the step of providing a coating or film according to the first aspect between a separator and at least one electrode of the rechargeable battery, and drying said coating or film to thereby shrink the second material to improve or enhance porosity of the porous layer.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figure, of which.

DESCRIPTION OF PREFERRED EMBODIMENTS

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described, which may be requirements for some embodiments but not other embodiments.

Temperature-Responsive Self-Shutdown Coating or Film

Figure 1:
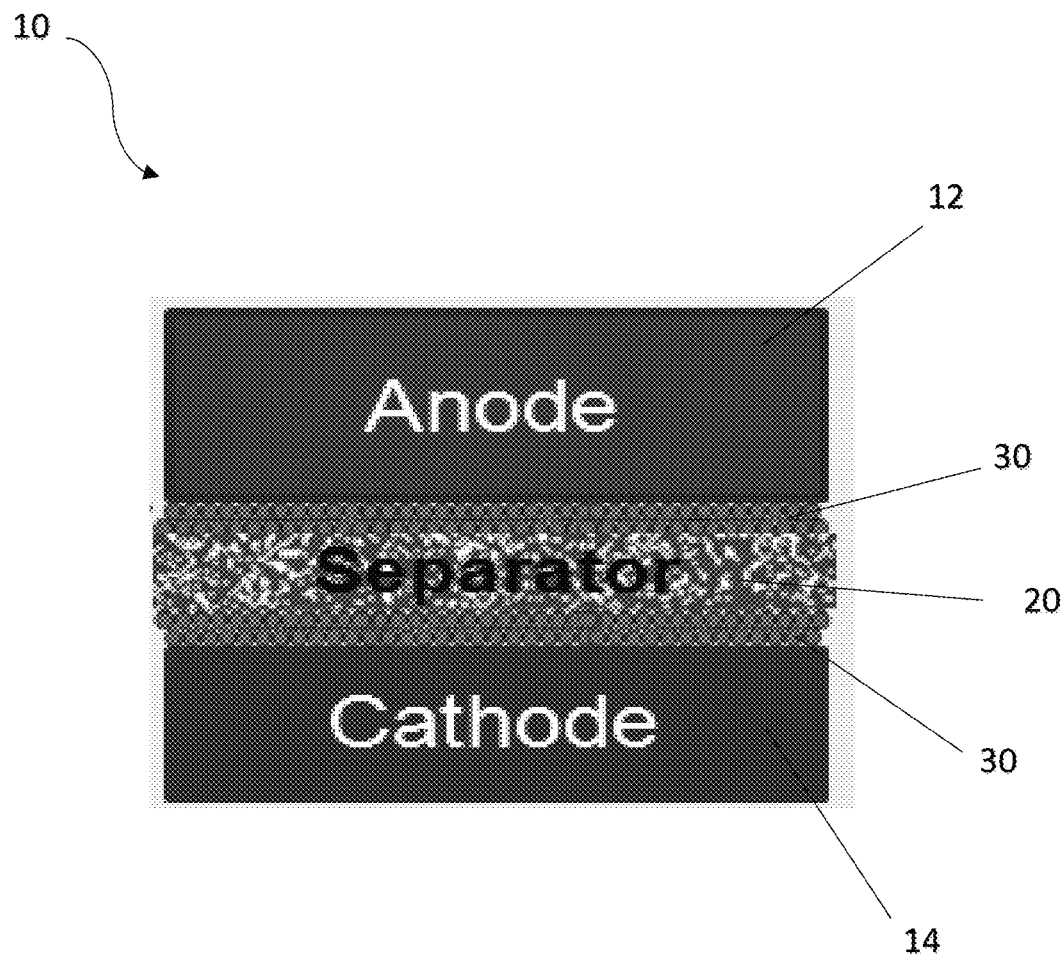
FIG. 1 is a side cross-sectional view showing a portion of a rechargeable battery comprising a separator coating or film according to a first embodiment of the present invention.

Referring to FIG. 1, shown is a partial view of a rechargeable battery 10 such as, but not limited to, a lithium ion rechargeable battery 10 having an anode 12 and a cathode 14 separated by a separator or membrane 20. The separator 20 allows ionic charge carriers or ions of the liquid electrolyte to pass therethrough and to transport between the two electrodes so as to form a close electric circuit in the electrochemical cell. It is important for the separator 20 to be chemically and electrochemically stable with regard to the electrolyte and the electrodes, as well as being mechanically strong enough to withstand mechanical damages. Suitable materials for the separator 20 can be, but are not limited to, nylon, polyesters, glass fibers, polypropylene (PP), polyethylene (PE), poly(tetrafluoroethylene) (PTFE) and/or polyvinyl chloride (PVC).

Specifically, at least one coating or film 30 can be arranged between the separator 20 and one or more of the electrodes 12, 14. In one embodiment, the coating or film 30 can be provided in the form of a coating layer adapted to be deposited or coated on one or more surfaces of the separator 20. Alternatively, the coating or film 30 can be prepared in the form of a separate film layer adapted to be subsequently placed or arranged between the one or more surfaces of the separator 20 and one or more of the respective electrodes 12, 14.

Figure 2:
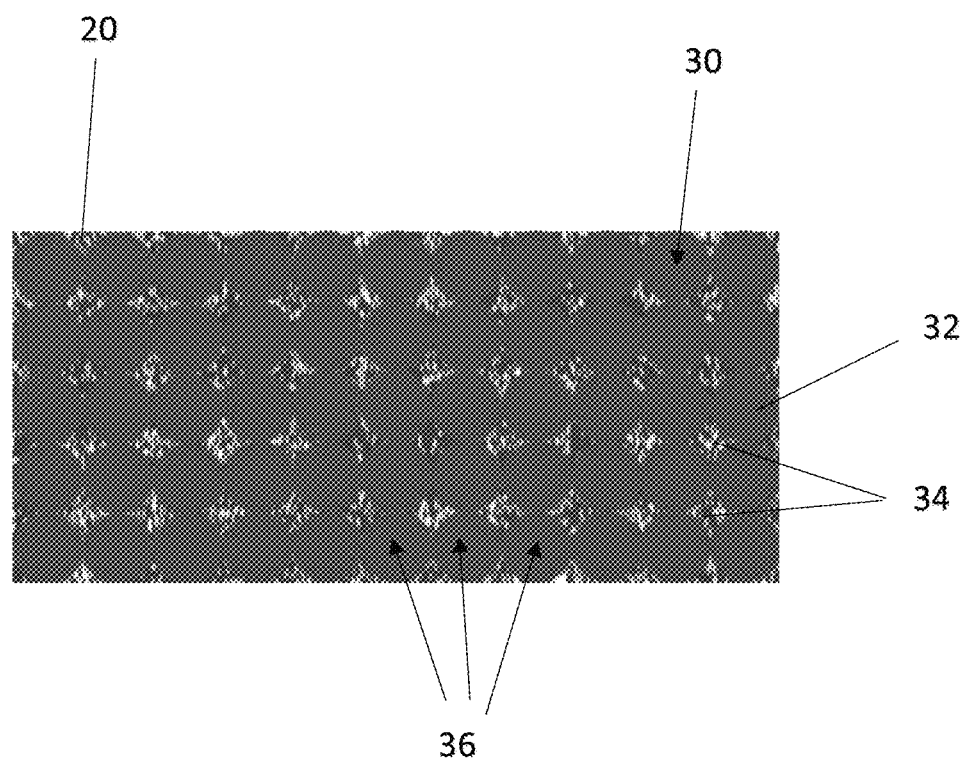
FIG. 2 is a top view showing a separator coating or film according to a second embodiment the present invention.

As more clearly shown in FIG. 2, the coating or film 30 may comprise a first material porous layer 32 with pores or channels 34 capable of allowing a passage of ions therethrough during its normal operating condition, for example, in one embodiment, at a temperature below about 80° C. However, in response to an abnormal temperature change such as during an unexpected elevated temperature due to excessive heat generation caused by, for example, a short circuit of the rechargeable battery 10, the first material 32 is adapted to substantially close the pores 34 to thereby substantially reduce, minimize or prevent further passage of ions through the first material porous layer 32. Consequently, the electric circuit is interrupted to some degree such that the electrochemical cell is substantially shut down to thereby prevent further generation of heat. Safety hazards such as thermal runaway can thus be avoided or occurrences of such events be substantially reduced. In one embodiment, the pores closure of the first material porous layer 32 is achieved by arranging the first material 32 to be capable of undergoing at least one phase change in response to the temperature change, during which the pores 34 of the first material porous layer 32 are adapted to substantially close to thereby substantially reduce, minimize or prevent further passage of ions.

Preferably, the first material porous layer 32 may comprise a plurality of particles 36 interconnected to form a porous network comprising the pores 34. In one preferred embodiment, the first material porous layer 32 may demonstrate a porosity of about 15% to about 30%. In response to temperature change, the plurality of particles 36 are adapted to fuse together to thereby substantially reduce in size, close or block the pores 34 of the porous network to allow a "self-shutdown" to the operation of the battery 10. For example, the first material 32 is adapted to undergo a first phase change at a first temperature. The first temperature can be, for example, a glass-transition temperature ($T_g$) of the first material 32 at which the first material 32 starts to soften or deform to close the pores 34. The first material 32 may further be adapted to undergo a second phase change at a second temperature higher than the first temperature, such as a melting temperature ($T_m$), at which the first material porous layer 32 is melted and started to fall apart. This is applicable to a first material 32 which comprises, for example, one or more amorphous and semi-crystalline polymers.

In one embodiment, the first temperature and the second temperature may be covered by a range of melting temperatures ($T_m$) of the first material 32. For example, the range of melting temperatures ($T_m$) may comprise an initial melting temperature ($T_{m1}$) as the first temperature at which the first material porous layer 32 starts to melt. The melting may continue over a range of increasing temperatures at which the pores 34 are closed substantially. Eventually, the first material 32 may reach a melt down temperature ($T_{m2}$) as the second temperature, at which the first material porous layer 32 is melted down and fallen apart. This is applicable to a first material 32 which comprises, for example, one or more crystalline polymers.

Preferably, the second temperature and the first temperature are of a difference of at least 20° C. In one specific embodiment, the glass-transition temperature ($T_g$) falls at a range of about 80° C. to about 150° C., and the melting temperature ($T_m$) falls at a range of about 100° C. to about 250° C.

For example, the plurality of particles 36 of the first material porous layer 32 may comprise one or more polymeric materials formed of at least one of the following monomers: methyl methacrylate, methyl acrylate, ethyl methacrylate, ethyl acrylate, butyl methacrylate, butyl acrylate, isobutyl acrylate, isobutyl methacrylate, ethylhexyl methacrylate, ethylhexyl acrylate, 2-hydroxyethyl acrylate, 2-hydroxyethyl methacrylate, isooctyl acrylate, isooctyl methacrylate, lauryl acrylate, lauryl methacrylate, isodecyl acrylate, isodecyl methacrylate, acrylic acid, methacrylic acid, acrylic salt, methacrylic salt, acrylonitrile, methacrylonitrile, acrylamide, methacrylamide, styrene, divinyl benzene, epoxy resin, bisphenol A, ethylene oxide, fluorine-containing monomer, etc. although a person skilled in the art will be capable of selecting and applying any other materials suitable for the claimed purpose without deviating from the spirit and scope of the present invention. Depending on the synthetic and preparation processes, the plurality of particles 36 can be configured with one or more shapes comprising, but not limiting to, spheres, rods, cuboids, needles, cubes, ellipsoids, prisms, cones, tetrahedrals, irregular shaped particles and any combination thereof.

Figure 3:
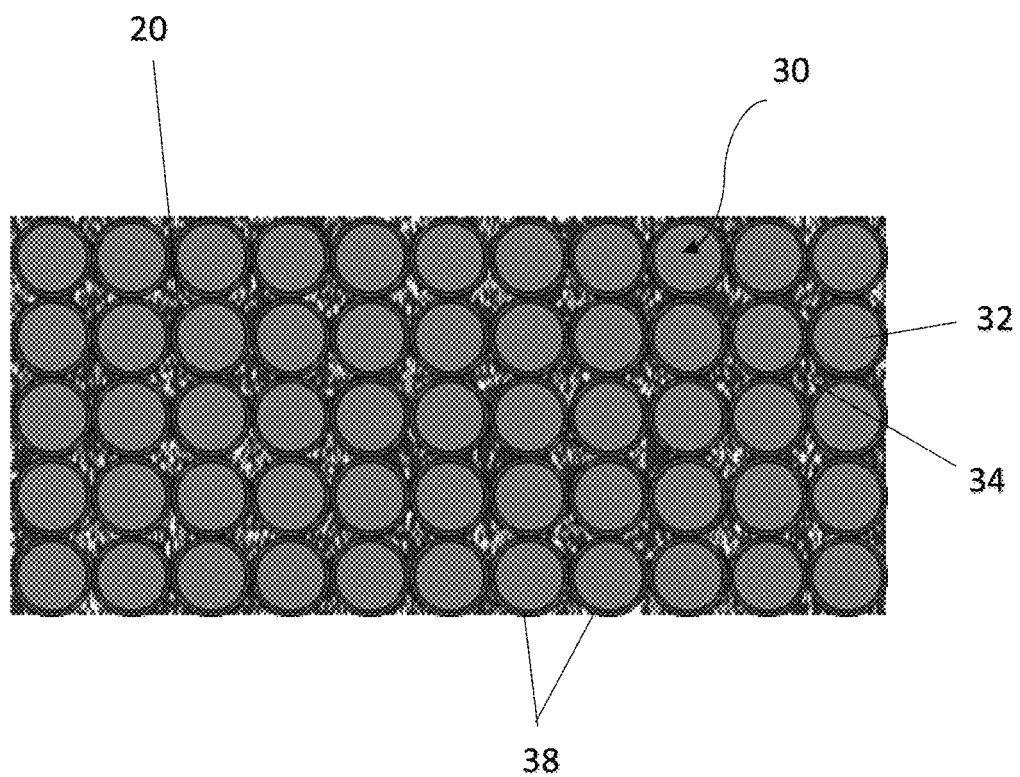
FIG. 3 is a top view showing the separator coating or film of FIG. 1.

Referring to FIG. 3, shown is another embodiment of the present invention in which the coating or film 30 further comprises an adhesive material 38 deposited on one or more surfaces of the first material porous layer 32 for adhering the first material 32 to one or more respective surfaces of the separator 20 and the respective electrodes 12, 14, as well as possibly binding the particles of the first materials 32 to form the interconnected porous network. The adhesive material 38 may comprise, for example, one or more polymeric materials formed of at least one of the following monomers: methyl methacrylate, methyl acrylate, ethyl methacrylate, ethyl acrylate, butyl methacrylate, butyl acrylate, isobutyl acrylate, isobutyl methacrylate, ethylhexyl methacrylate, ethylhexyl acrylate, 2-hydroxyethyl acrylate, 2-hydroxyethyl methacrylate, isooctyl acrylate, isooctyl methacrylate, lauryl acrylate, lauryl methacrylate, isodecyl acrylate, isodecyl methacrylate, acrylic acid, methacrylic acid, acrylic salt, methacrylic salt, acrylonitrile, methacrylonitrile, acrylamide, methacrylamide, styrene, divinyl benzene, epoxy resin, bisphenol A, ethylene oxide, fluorine-containing monomer, etc. although a person skilled in the art will be capable of selecting and applying any other materials suitable for the claimed purpose without deviating from the spirit and scope of the present invention.

Figure 4:
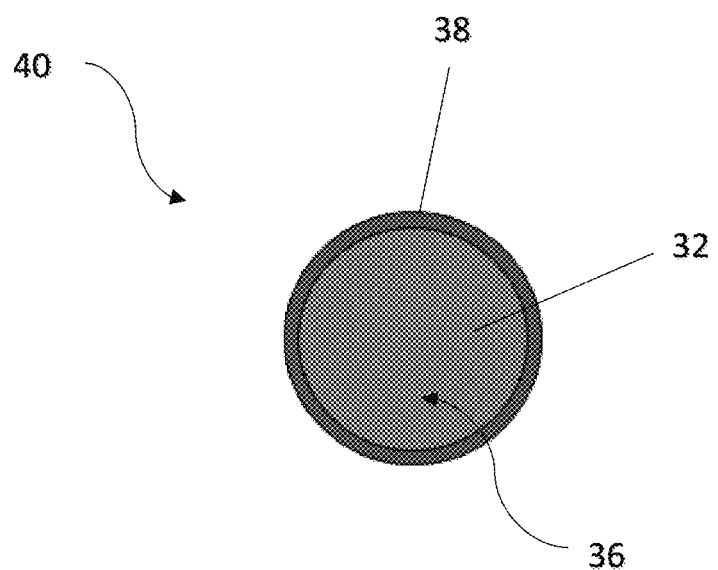
FIG. 4 is an enlarged view of a particle of the coating or film material as shown in FIG. 3.

Particularly, the adhesive material 38 is adapted to suppress thermal shrinkage of the porous network of the first material 32, and thus the separator 20. As more clearly shown in FIG. 4, the first material 32 and the adhesive material 38 can be configured in a core-shell structure. In one specific embodiment, the adhesive material 38 is capable of adhering the first material 32 to at least one surface of the separator 20 and the respective electrodes 12, 14 at an adhesive strength ranged from 5 N/m to 50 N/m.

Figure 5:
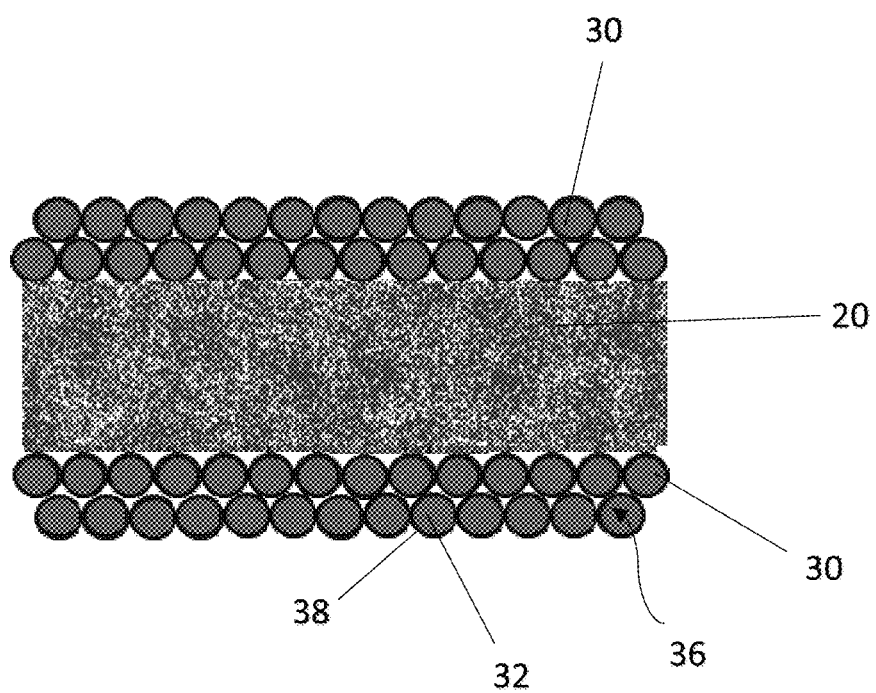
FIG. 5 is a side cross-sectional view showing arrangement of the coating or film of FIG. 3 at the separator.
Figure 6:
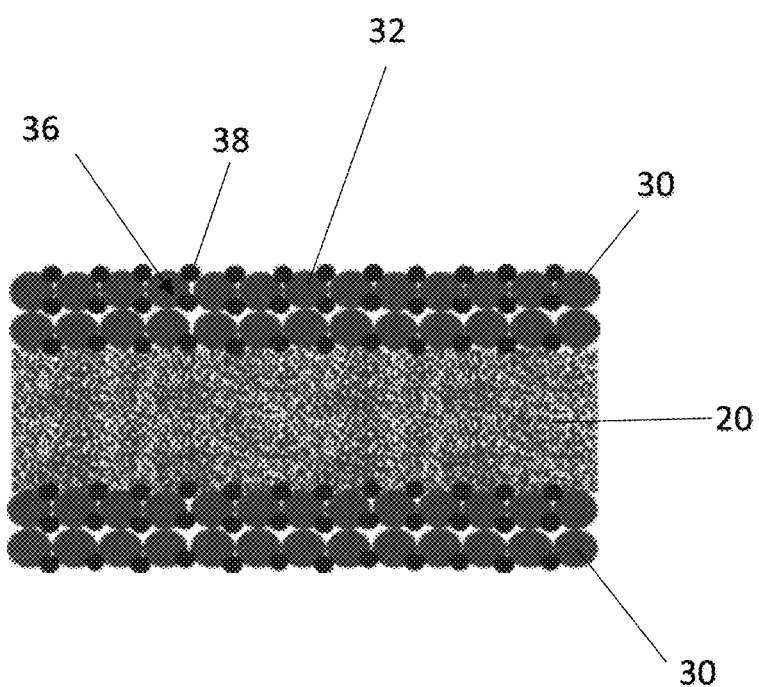
FIG. 6 is a side cross-sectional view showing arrangement of a coating or film according to a third embodiment of the present invention.
Figure 7:
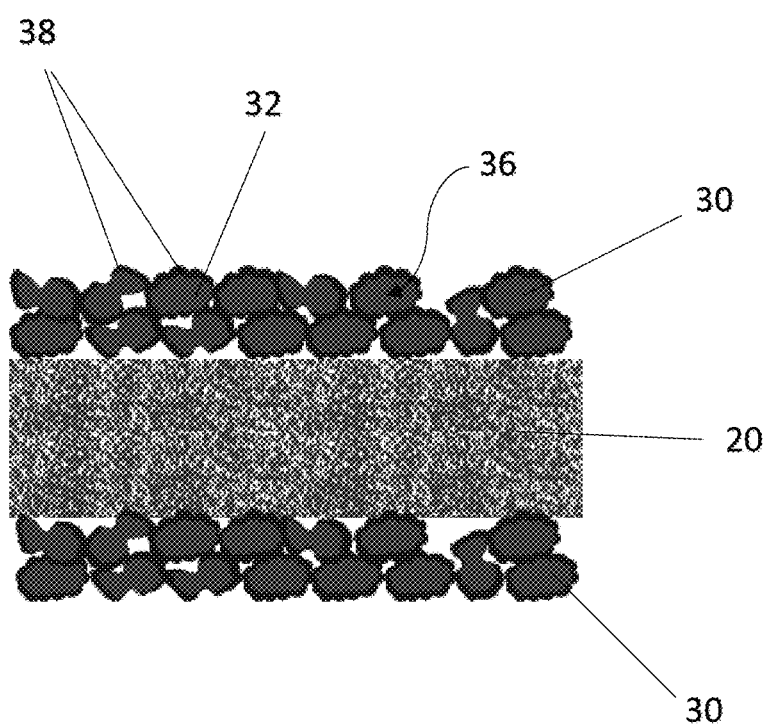
FIG. 7 is a side cross-sectional view showing arrangement of a coating or film according to a fourth embodiment of the present invention.
Figure 8:
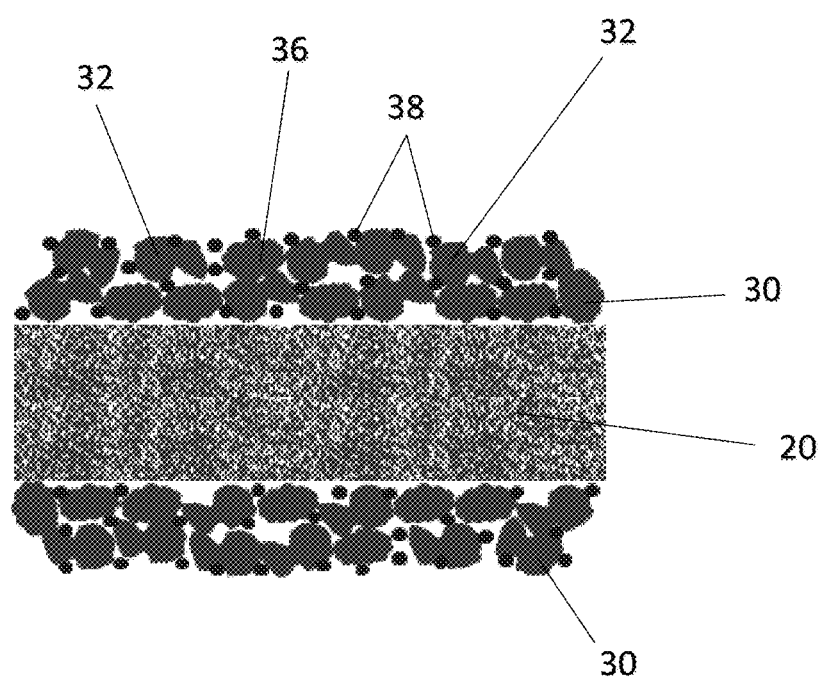
FIG. 8 is a side cross-sectional view showing arrangement of a coating or film according to a fifth embodiment of the present invention.
Figure 9:
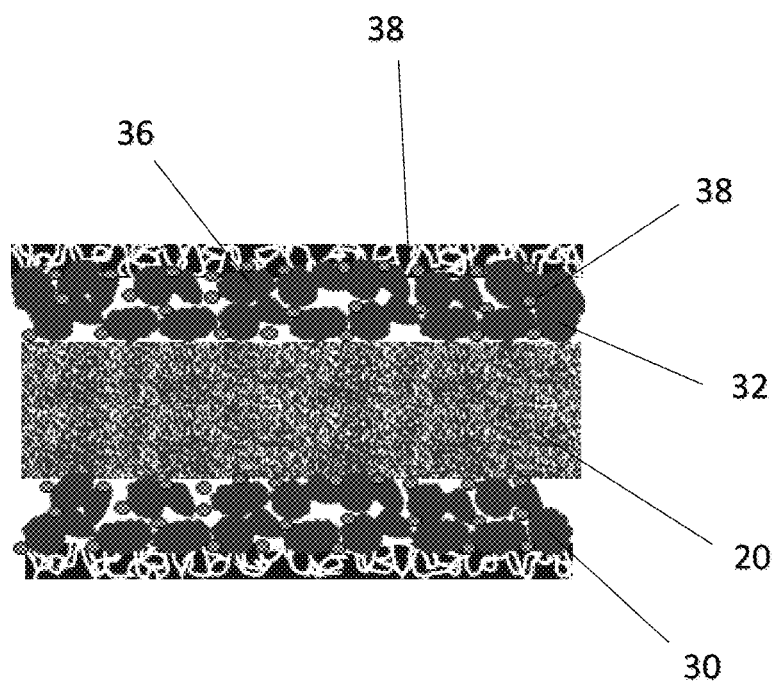
FIG. 9 is a side cross-sectional view showing arrangement of a coating or film according to a sixth embodiment of the present invention.

Various arrangements and configurations of the coating or film 30 having the first material 32 and the adhesive material 38 are further illustrated in FIGS. 5 to 9. For example, spherical particles 40 with a core-shell structure, i.e. with the first material 32 forming the core and the adhesive material 38 forming the shell, are shown in FIG. 5. FIG. 6 shows an embodiment having regularly shaped particles 36 of the first material 32, with the adhesive material 38 being dispersed in layers among the particles 36 of the first material 32. FIG. 7 shows another embodiment having irregularly shaped particles 36 of the first material 32, with surfaces being partially or substantially covered by the adhesive material 38. FIG. 8 shows a further embodiment having irregularly shaped particles 36 of the first material 32, with the adhesive material 38 being randomly dispersed among the particles 36 of the first material 32. FIG. 9 shows a further embodiment with irregularly shaped particles 36 of the first material 32, with the adhesive material 38 being randomly dispersed among the particles 36 and also, forming a top, porous layer above the first material 32 and adjacent the respective electrodes 12, 14 and serving as an adhesive layer between the porous network of the first material 32 and the respective electrodes 12, 14.

Figure 10:
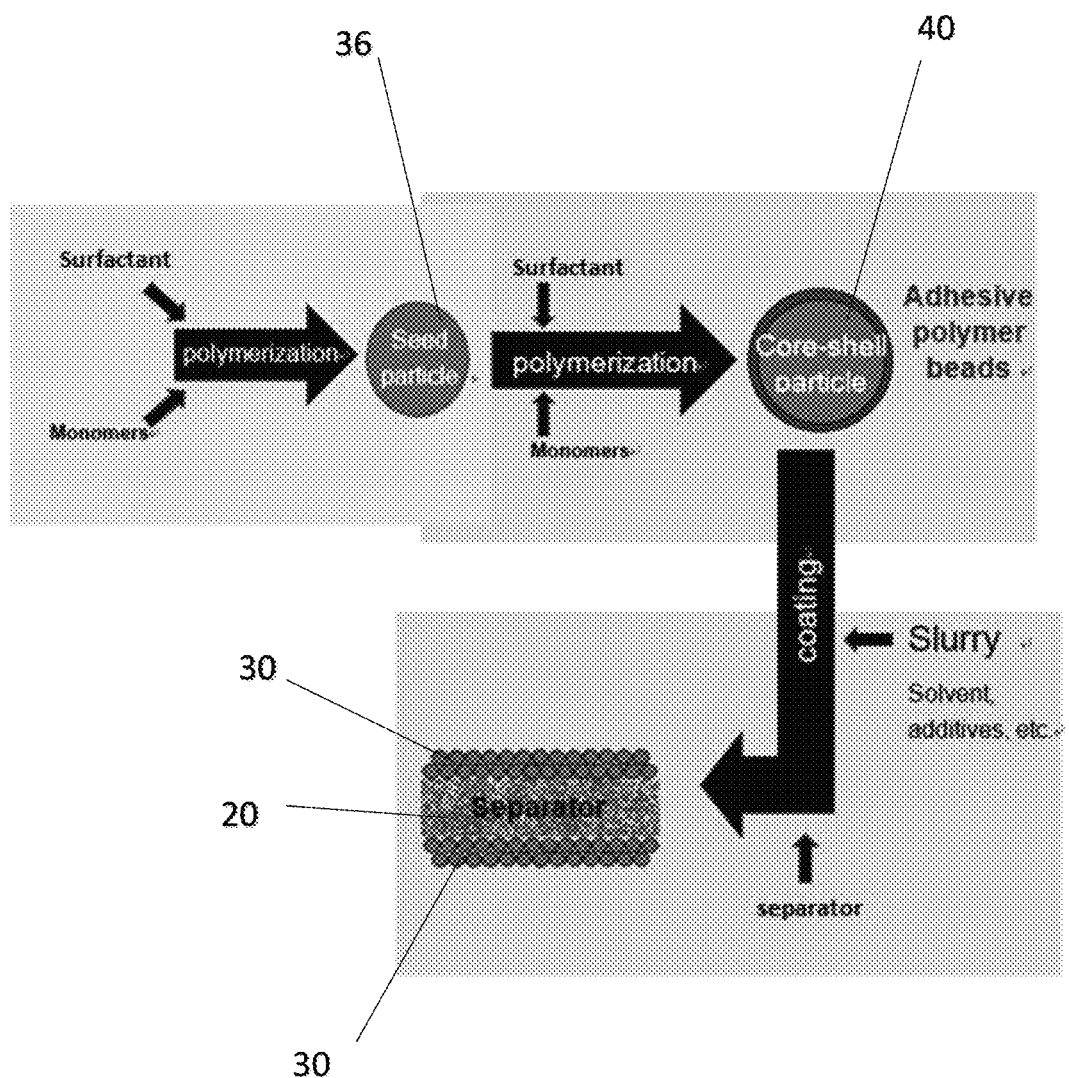
FIG. 10 is a flow diagram showing synthetic and preparation process of a separator with a coating or film embodied in the present invention.

An embodied synthetic and preparation process of the coating or film 30 comprising the first material 32 and the adhesive material 38, and the subsequent coating at the separator 20 is shown in FIG. 10. First, seed particles 36 of the first material 32 can be synthesized by known polymerization techniques such as emulsion polymerization in the presence of one or more surfactants and monomers. Examples of the surfactants can be, but are not limited to, ammonium ethoxylated alkyl sulfate and/or poly(ethylene oxide) (PEO); and examples of the monomers can be, but are not limited to, methyl methacrylate, acrylic acid, methacrylic acid, acrylamide, styrene and/or divinyl benzene. After the seed particles 36 are synthesized, further polymerizations such as seed emulsion polymerization can be performed in the presence of one or more surfactants and monomers to provide coating of the adhesive material 38 onto the seed particles of the first material 32 to form adhesive particles 40 with a core-shell structure. Examples of the surfactants can be, but are not limited to, ammonium ethoxylated alkyl sulfate and/or poly(ethylene oxide) (PEO); and examples of the monomers can be, but are not limited to, methyl methacrylate butyl acrylate and/or lauryl acrylate.

The adhesive particles 40 may then be dispersed in one or more solvents and optionally, in the presence of one or more additives such as thickener to form a slurry of coating material. The slurry may then be casted or coated onto the separator 20 by one or more processes such as gravure, dipping and/or slot-die, followed by drying of the solvents to form the film coated separator 20.

Figure 11:
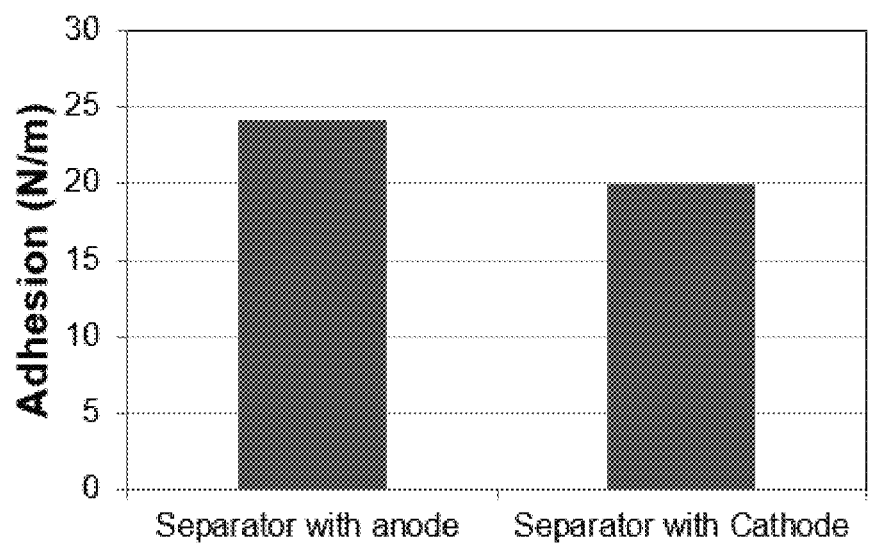
FIG. 11 shows the strength of adhesion between respective electrodes and a separator embodied in the present invention.
Figure 12:
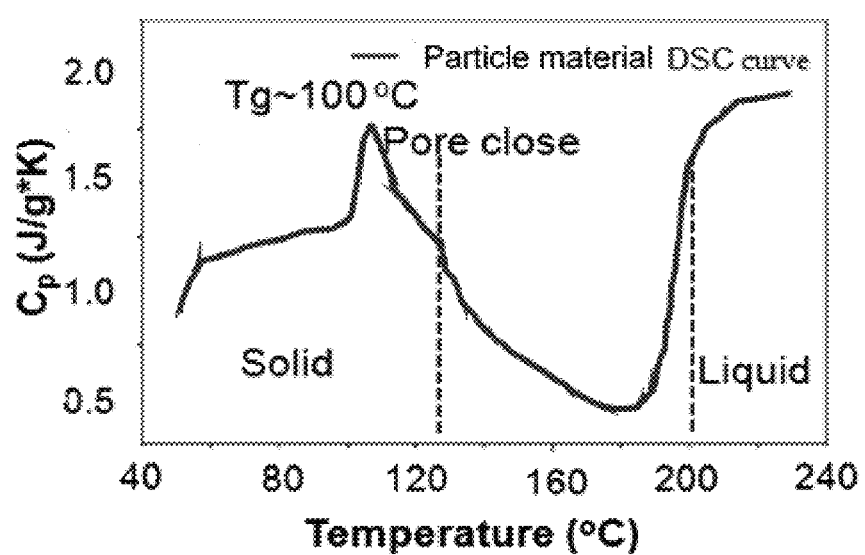
FIG. 12 shows the specific heat capacity verse temperature of a coating or film material according an embodiment of the present invention.

The coating or film 30 comprising the first material 32 and the adhesive material 38 has been characterized by various analytical techniques to demonstrate the advantageous properties of the present invention. For example, FIG. 11 shows the adhesive strength of the separator coating or film 30 comprising adhesive particles 40 in a core-shell structure. In this specific embodiment, the adhesive strength between the separator coating or film 30 and the anode 12 is found to be about 24 N/m, and the adhesive strength between the separator coating or film 30 and the cathode 14 is found to be about 20 N/m. FIG. 12 shows the differential scanning calorimetric (DSC) analysis of an embodied separator coating or film 30 which revealed a glass transition temperature ($T_g$) of about 100° C.

Temperature-Responsive Self-Shutdown Coating with Enhanced Air Permeability

Figure 13:
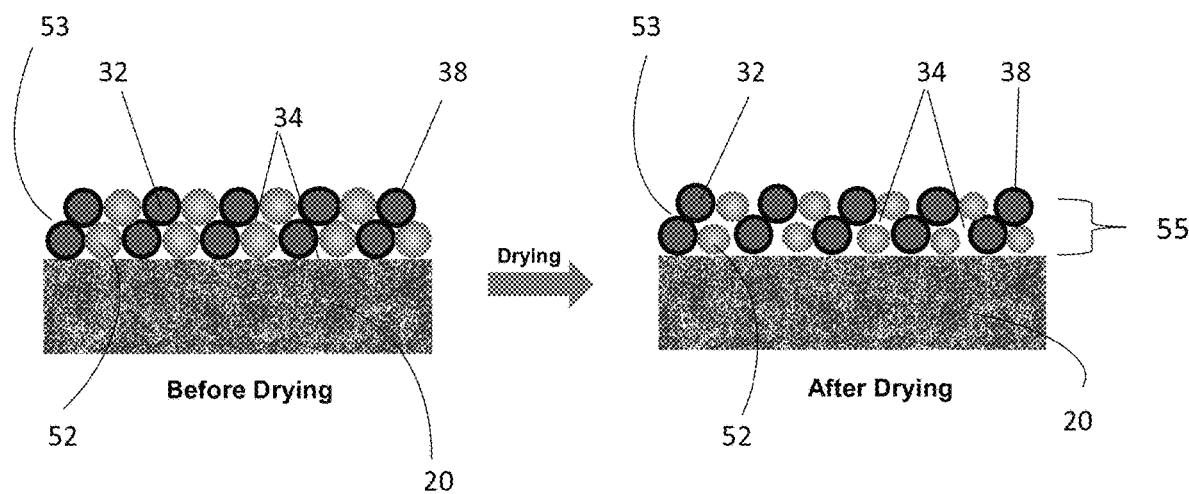
FIG. 13 is a side cross-sectional view showing arrangement of a coating or film according to a seventh embodiment of the present invention before and after drying.

The below described are further embodiments of the present invention. Unless indicated otherwise, same numerals have been applied to indicate same features or elements of the coating or film in these embodiments as to those described above. Referring to FIG. 13, shown is a further embodiment of the coating or film 30 of the present invention which comprises a second material 52 in addition to the first material 32 as previously described in forming a layer material 53 of the porous layer 55. Similar to the embodiments described above, the porous layer 55 comprises pores and/or channels 34 which allow passage of ions when the battery 10 is at its normal operating condition, for example, at a temperature below about 80° C. In one embodiment, the first material 32 and the second material 52 are preferred to be provided at a weight ratio of about 2:1 to about 2:10 in the layer material 53, for example.

More particularly, the second material 52 is provided such that it is adapted to shrink or reduce in size upon drying, for example, via evaporation of solvent from the composition after being cast or coated on the separator 20. Shrinkage of the second material 52 in the layer material 53 increases the number of pores and/or the size of the pores in the porous layer 55, which improves or enhances porosity of the porous layer 55, and thus air permeability of the coating or film 30 as a consequence. The improved air permeability is advantageous in enhancing performance of the battery 10. In one embodiment, the second material 52 is preferred to reduce in size by about 30 vol % to about 300 vol % upon complete drying, with the degree of shrinkage depending on the composition of the layer material 53. In one further embodiment, porosity of the porous layer 55 after drying and thus shrinkage of the second material 52 is preferred to be about 25% to about 75%.

In one embodiment, the first material 32 of the layer material 53 can be substantially non-shrinkable upon drying, i.e. with its size and volume being substantially unchanged to thereby maintain the overall size and shape of the coating or film 30 after the drying step. Alternatively, the first material 32 may also be shrinkable, but at a much lesser and/or insignificant extent when compared to the second material 52. For example, in one specific embodiment, the first material 32 is preferred to be shrinkage at only less than about 1%.

Preferably, the second material 52 is arranged to interconnect with the first material 32 in forming a porous network of layer material 53 which includes the pores 34. In one embodiment, the layer material 53 may comprise a plurality of particles formed of at least one of the first material and the second material interspersed among one another. For example, the layer material 53 may comprise a plurality of particles formed of the second material 52 interspersed among a porous network of the first material 32, or vice versa. The layer material 53 may also be arranged such that both the first and the second materials 32, 52 are present in particle form, with the first material particles and the second material particles being interconnected and interspersed among one another to form a porous network. The particles can be in one or more shapes such as, but are not limited to, spheres, rods, cuboids, needles, cubes, ellipsoids, prisms, cones, tetrahedrals, irregular shaped particles, etc. depending on the synthetic and preparation processes.

Similar to the embodiments as discussed earlier, during an abnormal operating condition in which excess heat is generated, the operating temperature of the battery 10 can be elevated to reach or even to pass a certain predetermined threshold temperature. In response to this temperature change, the first and second materials 32, 52 comprising layer material 53 will automatically undergo at least a first phase change during which the particles of the layer material 53 are fused together and thus substantially close or block the pores 34 of the porous network. Passage of ions through the layer is thus substantially reduced, minimized or even prevented and, as a consequence, chemical reaction of the battery 10 is automatically "shutdown" to reduce, minimize or prevent further heat generation.

For example, the layer material 53 is adapted to undergo a first phase change at a first temperature, such as a glass-transition temperature ($T_g$) of the layer material 53 at which the first material and the second material 32, 52 start to soften or deform to close the pores 34. The layer material 53 may further undergo a second phase change at a second temperature higher than the first temperature, such as a melting temperature ($T_m$), at which the layer material 53 is melted and started to fall apart. In one further embodiment, the first temperature and the second temperature may also be covered by a range of melting temperatures ($T_m$). For example, the range of melting temperatures ($T_m$) may comprise an initial melting temperature ($T_{m1}$) as the first temperature at which the porous layer 55 starts to melt. The melting may continue over a range of increasing temperatures at which the pores 34 are closed substantially. Eventually, the layer material 53 may reach a melt down temperature ($T_{m2}$) as the second temperature, at which the porous layer 55 is melted down and is fallen apart.

The second temperature and the first temperature are preferred to be of a difference of at least 20° C. More specifically, the glass-transition temperature ($T_g$) of the layer material 53 falls at a range of about 80° C. to about 150° C., and the melting temperature ($T_m$) of the layer material 53 falls at a range of about 100° C. to about 250° C. It is important to note that, when compared with the previous embodiments in which the porous layer comprises only the first material 32 as its major constituents i.e. without the shrinkable second material 52 in the porous layer, the incorporation of the second material 52 to the layer material 53 as currently exemplified has rendered no significant changes on the first and the second temperatures, i.e. the pore-closure and thus the self-shutdown temperature of the present embodiment. In other words, when compared with the previous embodiments in which no second material 52 is present in the coating layer, the incorporation of the second material 52 in the composition offers a significant improvement in enhancing air permeability of the formed porous layer 55, without affecting or compensating the temperature-responsive, self-shutdown efficacy of the present invention.

In one further embodiment, it is preferred that the second material 52 be formed of at least one hydrophobic monomer and at least one hydrophilic monomer. The hydrophilic component of the second material 52 is of particular significance as it contributes to the water absorption characteristic of the layer material 53, and therefore, is essential to facilitate the subsequent shrinkage of the second material 52 upon drying. The synthetic process of the first material 32 and the second material 52, and the further processing steps of the porous layer 55 involve known polymerization techniques which may include, but is not limited to, emulsion polymerization and seed emulsion polymerization in the presence of one or more surfactants and monomers, and that the relevant processes have also been discussed earlier and illustrated in FIG. 10. Details of the synthetic process of the layer material 53 are therefore not repeated here.

For example, the at least one hydrophobic monomer can be selected from a group consisting of: methyl methacrylate, methyl acrylate, ethyl methacrylate, ethyl acrylate, butyl methacrylate, butyl acrylate, isobutyl acrylate, isobutyl methacrylate, ethylhexyl methacrylate, ethylhexyl acrylate, isooctyl acrylate, isooctyl methacrylate, lauryl acrylate, lauryl methacrylate, isodecyl acrylate, isodecyl methacrylate, acrylonitrile, methacrylonitrile, styrene, t-Butyl styrene, divinyl benzene, epoxy resin, bisphenol A, fluorine-containing monomer, and a combination thereof. The at least one hydrophilic monomer can be selected from a group consisting of, for example, 2-hydroxyethyl acrylate, 2-hydroxyethyl methacrylate, acrylic acid, methacrylic acid, acrylic salt, methacrylic salt, acrylamide, methacrylamide, poly(ethyleneglycol) dimethacrylate, poly(ethyleneglycol) diacrylate, poly(ethyleneglycol) methacrylate, poly(ethyleneglycol) acrylate, and a combination thereof. The possible monomers in forming the first material 32 are basically the same as per previously discussed.

Similarly, the same adhesive material 38 as discussed earlier may also or optionally be included and deposited on one or more surfaces of the porous layer 55 for adhering the layer material 53 to one or more respective surfaces of the separator 20 and the respective electrodes 12, 14, as well as for binding the particles of the layer material 53 in forming the interconnected porous network. As the relevant compositions, functions and/or configurations of the adhesive material 38 when used in relation to both the first and the second materials 32, 52 in the layer material 53, instead of the first material 32 alone, is substantially similar if not the same to what has been described in the previous embodiments above, details of the same are not repeated here. For example, the adhesive material 38 can be arranged to cover the particles of the first and/or the second materials 32, 52 to thereby forming core-shell structures to interconnect the first and the second materials 32, 52 in the porous layer 55. Alternatively, the adhesive material 38 may also be randomly dispersed or arranged in layers among the particles of the first and/or second materials 32, 52, for example. The coating or film 30 which comprises the adhesive material 38 and both of the first and the second materials 32, 52 in the layer material 53 is found to demonstrate a superior adhesive strength of about 5 N/m to about 50 N/m when adhering to surfaces of the separator 20 and the respective electrodes 12, 14.

Figure 14:
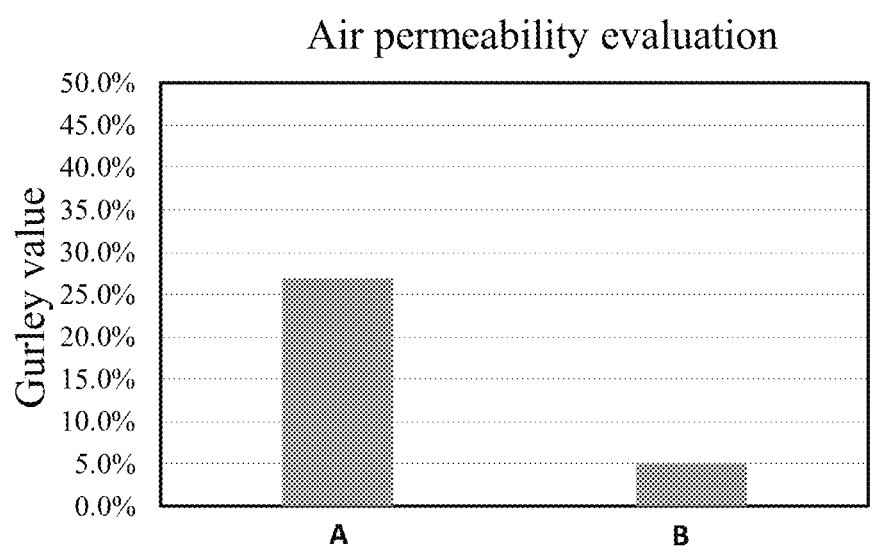
FIG. 14 shows the enhanced air permeability of the coating or film of FIG. 13 at a normal operating condition.
Figure 15:
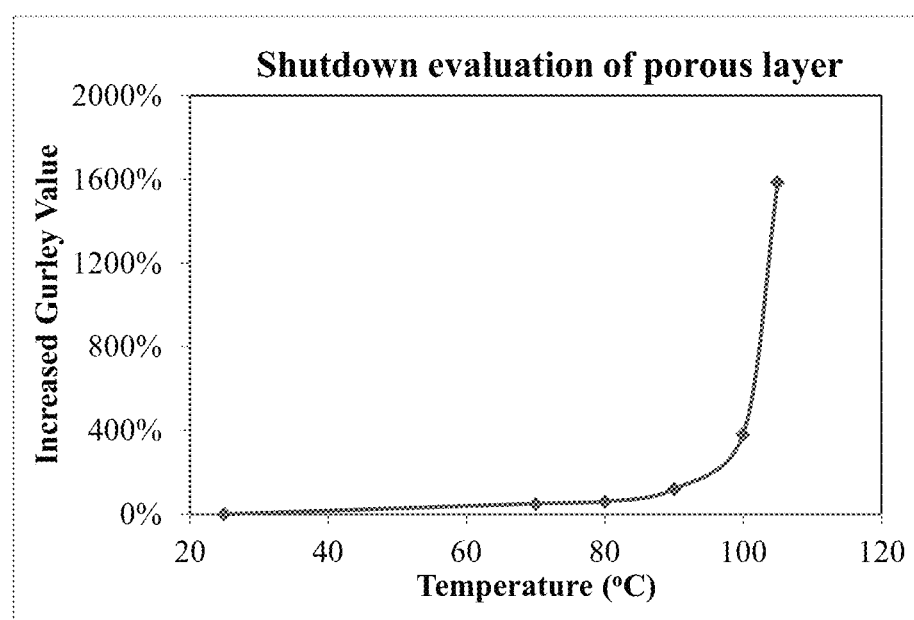
FIG. 15 shows the result of the temperature-responsive shut-down of the coating or film of FIG. 13 at elevated temperatures.

The coating or film 30 having both the first material 32 and the second material 52 in its composition has further been characterized for its air permeability and temperature-responsive self-shutdown efficacy. Specifically, air permeability of the coating or film 30 which is synthesized without the second material 52, i.e. Sample A vs one which comprises the second material 52, i.e. Sample B, are characterized and compared in FIG. 14. It is shown that the coating 30 formed of both the first and the second materials 32, 52, i.e. Sample B, demonstrates a much lower Gurley value, which represents a significantly higher air permeability than Sample A, which is formed without the second material 52. FIG. 15 further reveals the temperature-responsive self-shut down profile of the coating 30 of Sample B, which demonstrates a sharp increase in its Gurley value at around 100° C. The sharp increase in the Gurley value reflects a prompt closure of the pores 34 of the porous layer 55 at about the glass-transition temperature of the layer material 53, which supports the temperature-responsive shutdown of chemical reaction of the battery when the operating temperature has elevated above a certain safety limit.

The present invention further relates to a separator of a rechargeable battery such as a lithium ion battery comprising the coating or film as described above. The present invention also relates to a rechargeable battery such as a lithium ion battery having such a separator; and a method of manufacturing the rechargeable battery by providing the described coating or film between a separator and at least one electrode of the rechargeable battery, and subsequently, drying said coating or film to thereby shrink the second material to improve or enhance porosity of the porous layer.

The present invention is advantageous in that it provides an automatic, temperature-responsive, self-shut down mechanism to a coating or film for a rechargeable battery separator effective in preventing, minimizing or reducing excess heat generation due to a malfunction of a rechargeable battery and, at the same time, allows the coating or film with an improved or enhanced air permeability at its normal operating condition. The enhanced air permeability is achieved by having at least one of the major constituents of the porous layer material of the coating as being shrinkable upon drying, for example, after being casted or coated onto the separator during the preparation or manufacturing step, with the shrinkage of said material substantially enlarges the pore size and/or increases the number of pores at the porous layer. Particularly, the coating or film of the present invention allows ion transfer with enhanced air permeability at a normal operating temperature, e.g. at a temperature below 80° C., and is adapted to actuate pores closure by fusion of the layer material at a temperature between 80° C. to 150° C. to thereby "shut-down" reaction of the electrochemical cell. The fusion of material preferably happens at or above the first temperature, which is generally the glass transition temperature ($T_g$) or the initial melting temperature ($T_{m1}$) of the layer material at which it starts to melt. A preferred difference of at least 20° C. between the first temperature and the second temperature, which is generally the fallen apart temperature of the layer material, is required to allow sufficient time for a substantial closure of pores before the coating or film is substantially melted down and fallen apart.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A coating or film adapted to be arranged between a separator and at least one electrode of a rechargeable battery, the coating or film comprising:
a porous layer comprising a layer material having at least a first material and a second material, the first and the second materials being arranged to comprise a plurality of pores for passage of ions therethrough; and the second material is adapted to reduce in size upon drying such that porosity of the porous layer is improved or enhanced at a normal operating temperature;
wherein, in response to temperature change, the layer material is adapted to undergo a first phase change during which the pores of said porous layer are adapted to substantially close to thereby substantially reduce or prevent further passage of ions.

2. The coating or film according to claim 1, wherein the second material is interconnected with the first material to form a porous network comprising the pores.

3. The coating or film according to claim 1, wherein, upon drying, a size of the first material remains substantially unchanged.

4. The coating or film according to claim 1, wherein the second material is adapted to reduce in size by about 30 vol % to about 300 vol % after drying.

5. The coating or film according to claim 1, wherein the layer material comprises a plurality of particles formed of at least one of the first material and the second material interspersed among one another.

6. The coating or film according to claim 5, wherein the plurality of particles are adapted to fuse together in response to the temperature change to thereby substantially close or block the pores of the porous network.

7. The coating or film according to claim 1, wherein porosity of the porous layer after drying is about 25% to about 75%.

8. The coating or film according to claim 1, wherein the first material and the second material are provided at a weight ratio of about 2:1 to about 2:10.

9. The coating or film according to claim 1, wherein the second material is formed of at least one hydrophobic monomer and at least one hydrophilic monomer.

10. The coating or film according to claim 1, wherein the layer material is adapted to undergo the first phase change at a first temperature.

11. The coating or film according to claim 10, wherein the first temperature is a glass-transition temperature at which the layer material starts to soften.

12. The coating or film according to claim 10, wherein the layer material is adapted to undergo a second phase change at a second temperature higher than the first temperature, the second temperature being a melting temperature at which the layer material is melted and fallen apart.

13. The coating or film according to claim 11, wherein the glass-transition temperature is at a range of about 80° C. to about 150° C.

14. The coating or film according to claim 12, wherein the melting temperature is at a range of about 100° C. to about 250° C.

15. The coating or film according to claim 12, wherein the second temperature is at least about 20° C. higher than the first temperature.

16. The coating or film according to claim 1, wherein the layer material further comprises a third material deposited among the first and the second materials for adhering the porous layer with one or more respective surfaces of the separator and the at least one electrode.

17. The coating or film according to claim 16, wherein the third material is adapted to cover the plurality of particles of at least one of the first and the second materials to thereby forming core-shell structures.

18. The coating or film according to claim 16, wherein the plurality of particles of the layer material are interconnected via the third material.

19. A rechargeable battery having a separator comprising a coating or film according to claim 1.

20. A method of manufacturing a rechargeable battery, the method comprising the step of:
providing a coating or film according to claim 1 between a separator and at least one electrode of the rechargeable battery; and drying the coating or film to thereby shrink the second material to improve or enhance porosity of the porous layer.

* * * * *